United States Patent [19]

Yamamuro et al.

[11] Patent Number: 4,478,105
[45] Date of Patent: Oct. 23, 1984

[54] HYDRAULIC CONTROL SYSTEM FOR CONTINUOUSLY VARIABLE V-BELT TRANSMISSION WITH HYDRODYNAMIC TRANSMISSION UNIT

[75] Inventors: Sigeaki Yamamuro, Zushi; Hiroyuki Hirano; Yoshiro Morimoto, both of Yokosuka; Yoshikazu Tanaka, Yokohama, all of Japan

[73] Assignee: Nissan Motor Company, Limited, Yokohama, Japan

[21] Appl. No.: 362,487

[22] Filed: Mar. 26, 1982

[30] Foreign Application Priority Data

Mar. 28, 1981 [JP] Japan .................................. 56-44748
Mar. 28, 1981 [JP] Japan .................................. 56-44750

[51] Int. Cl.³ ...................... F16H 47/00; F16H 37/00; F16D 35/00; F16D 21/04
[52] U.S. Cl. .......................................... 74/730; 74/689; 74/731; 192/3.3; 192/0.092
[58] Field of Search ................. 74/730, 731, 689, 751, 74/752 C, 866, 867; 474/11, 17, 18, 28, 70; 192/3.3, 3.29, 0.092

[56] References Cited

U.S. PATENT DOCUMENTS

| | | | |
|---|---|---|---|
| 3,044,316 | 7/1962 | Forster | 74/868 X |
| 3,719,093 | 3/1973 | Edmonds | 74/733 X |
| 4,161,894 | 7/1979 | Giacosa | 474/28 X |
| 4,176,564 | 12/1979 | Ahlen et al. | 74/730 X |
| 4,177,694 | 12/1979 | Lachaize | 74/730 X |
| 4,274,520 | 6/1981 | Van der Hardt Aberson | 192/3.32 |
| 4,304,150 | 12/1981 | Lupo et al. | 74/677 |
| 4,345,489 | 8/1982 | Muller et al. | 74/752 C X |
| 4,383,456 | 5/1983 | Ganoung | 74/866 |
| 4,387,608 | 6/1983 | Mohl et al. | 74/867 X |
| 4,400,164 | 8/1983 | Cadee | 474/28 X |

FOREIGN PATENT DOCUMENTS

| | | | |
|---|---|---|---|
| 1209442 | 1/1966 | Fed. Rep. of Germany | 74/730 |
| 2012891 | 1/1979 | United Kingdom | 74/730 |

Primary Examiner—Allan D. Herrmann
Assistant Examiner—Bruce F. Wojciechowski
Attorney, Agent, or Firm—Schwartz, Jeffery, Schwaab, Mack, Blumenthal & Koch

[57] ABSTRACT

A continuously variable V-belt transmission comprises means for producing a signal indicative of state of a hydrodynamic transmission unit which is drivingly connected to a continuously variable V-belt transmission unit. A line pressure regulator valve regulates fluid supplied by a pump in response to the signal to produce a line pressure variable depending upon the state of the hydrodynamic transmission unit.

14 Claims, 5 Drawing Figures

HYDRAULIC CONTROL SYSTEM FOR CONTINUOUSLY VARIABLE V-BELT TRANSMISSION WITH HYDRODYNAMIC TRANSMISSION UNIT

BACKGROUND OF THE INVENTION

1. Field of the Invention

The present invention relates to a hydraulic control system for a continuously variable V-belt transmission including a hydrodynamic transmission unit.

2. Description of the Prior Art

Figure 1:
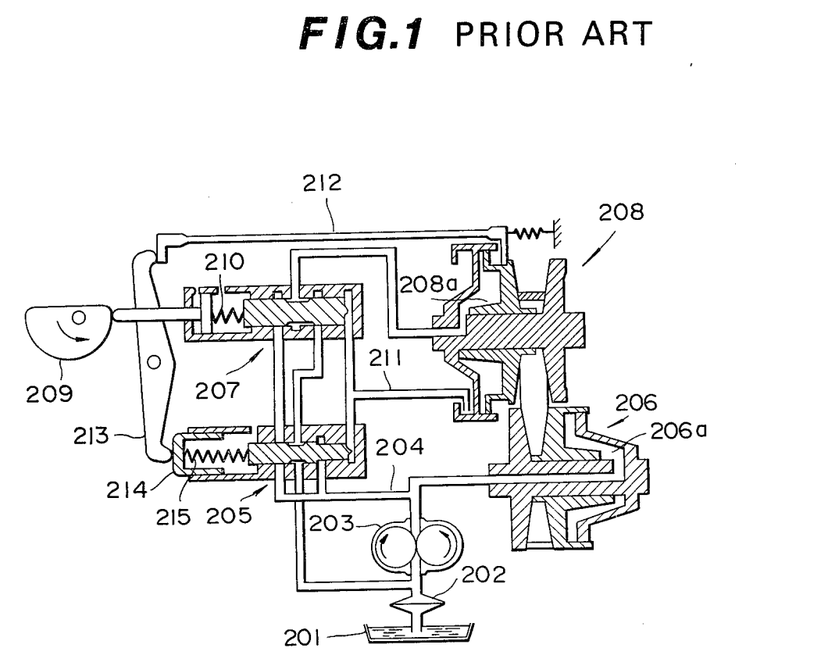
FIG. 1 is a diagrammatic view of a conventional hydraulic control system for a continuously variable V-belt transmission.

As a control system for a conventional continuously variable V-belt transmission (hereinafter in the present specification referred to as a "continuously variable transmission"), a hydraulic control system is known from Australian pat. 52,356/79, which is shown in FIG. 1. Referring to FIG. 1, oil within a tank 201 is discharged into an oil conduit 204 by an oil pump 203 after passing through a filter 202 and supplied thereafter to a line pressure regulator valve 205. The line pressure provided after pressure regulation by the line pressure regulator valve 205 is supplied on one hand to a cylinder chamber 206a of a driven pulley 206 and on the other hand to a cylinder chamber 208a of a drive pulley 208 via a shift control valve 207. The shift control valve 207 feeds to the cylinder chamber 208a a predetermined oil pressure in response to balance between a rightward directed force created by a spring 210 resulting from rotatable movement of a throttle cam 209 and a leftward directed force produced by oil pressure from the oil conduit 211, thus controlling a shift between the drive pulley 208 and driven pulley 206. It is constructed and arranged such that the oil pressure responsive to revolution speed of the drive pulley 208 builds up in the oil conduit 211. The oil conduit 211 is connected also to the line pressure regulator valve 205 to create the leftward directed force in the line pressure regulator valve 205. To the line pressure regulator valve 205, an axial movement of the drive pulley 208 is transmitted via a rod 212, a lever 213, a slider 214 and a spring 215 such that a force increasing as the reduction ratio between the pulleys 208 and 206 increases is impressed upon the line pressure regulator valve 205. The line pressure regulator valve 205 is constructed and arranged such that oil pressure is produced which increases as the rightward directed force increases and the leftward directed force decreases, so that the line pressure increases as the reduction ratio increases and the line pressure increases as the revolution speed of the drive pulley 208 decreases. That is, the line pressure is controlled in response to reduction ratio and revolution speed of the drive pulley.

However, since, as mentioned above, in a conventional continuously variable transmission, the line pressure is controlled only by reduction ratio and revolution speed of a drive pulley and has no connection with output torque of an engine, it is necessary to set the line pressure sufficiently high enough not to permit slip between the V-belt and pulleys upon production of a maximum torque by an engine for the purpose of always ensuring a torque transmission capacity by the V-belt necessary from the range where the engine produces a small output to the range where the engine produces a large output. It therefore follows that the line pressure is higher than necessary when the output torque of the engine is low, thus applying an oil pressure higher than necessary to the V-belt, thus creating a problem that the endurance of the V-belt drops and a problem that an oil pump must be used which discharges such an unnecessarily high pressurized oil. Besides, the power transmission efficiency of a V-belt gets worse as the difference between the maximum transmission capacity of the V-belt and the actual transmission drive increases, so that it is not desirable from the standpoint of the efficiency either that the oil pressure is higher than necessary.

SUMMARY OF THE INVENTION

According to the present invention, a continuously variable V-belt transmission comprises means for producing a signal indicative of state of a hydrodynamic transmission unit which is drivingly connected to a continuously variable V-belt transmission unit and line pressure regulator valve means for regulating fluid supplied by pumping means in response to the signal to produce a line pressure variable depending upon the state of the hydrodynamic transmission unit.

According to a first embodiment of the invention, whether a hydrodynamic transmission unit multiplies torque or the hydrodynamic transmission unit ceases its torque multiplicaion function is detected by the fluid pressure in a fluid conduit which changes when the hydrodynamic transmission unit locks up. Via the fluid conduit, a lock-up valve supplies the fluid to or discharge the fluid from a lock-up chamber for a lock-up clutch. The line pressure regulator valve is responsive to the fluid pressure in the fluid conduit and reduces the level of the line pressure during operation of the hydrodynamic transmission unit in the lock-up state.

According to a second embodiment of the present invention, the degree of torque multiplication in a hydrodynamic transmission unit is detected by stator reaction. The line pressure regulator valve is responsive to fluid pressure variable with the stator reaction of the hydrodynamic transmission unit and reduces the level of the line pressure as the stator reaction decreases.

An object of the present invention is to provide a continuously variable V-belt transmission wherein the level of a line pressure is tailored along a variation in torque to be transmitted by a continuously variable V-belt transmission unit following a hydrodynamic transmission unit.

BRIEF DESCRIPTION OF THE DRAWINGS

The present invention is more specifically described in connection with the accompanying drawings, wherein.

DETAILED DESCRIPTION OF THE INVENTION

Referring to the accompanying drawings, the first embodiment is described hereinafter with reference to FIGS. 2 through 4.

Figure 2:
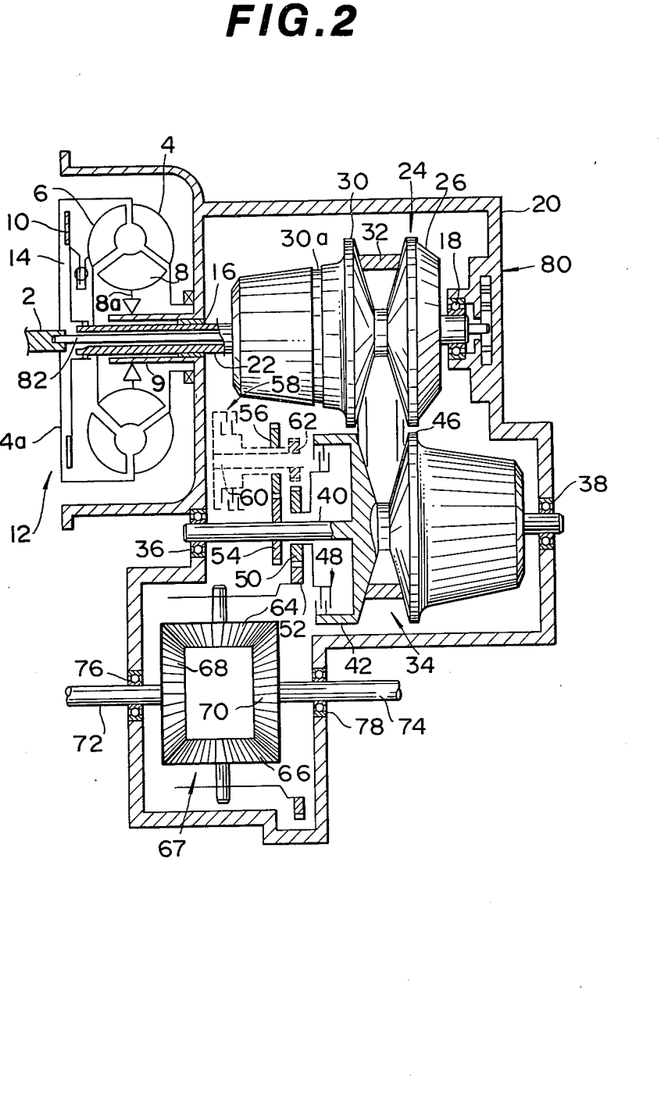
FIG. 2 is a diagrammatic view illustrating a power transmission mechanism of a continuously variable transmission.
Figure 3:
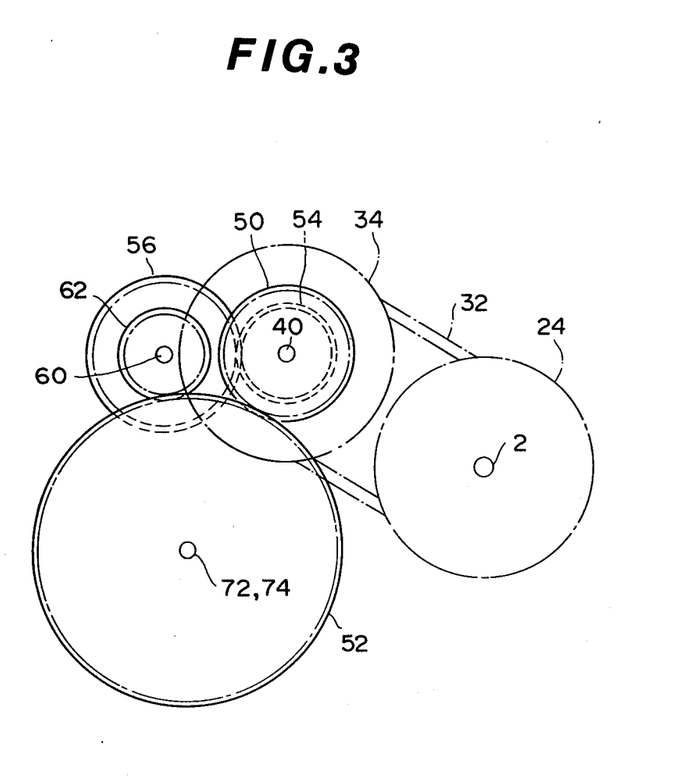
FIG. 3 is a layout of the shafts used in the continuously variable transmission shown in FIG. 2.

As shown in FIG. 2, a continuously variable V-belt transmission includes a hydrodynamic transmission unit 12 drivingly connected to a drive shaft 22 of continuously variable V-belt transmission unit 24. The hydrodynamic transmission unit 12 is in the form of a torque converter although it may be in the form of a fluid coupling. The torque converter 12 includes a pump impeller 4 connected to an engine output shaft 2 rotatable with a crankshaft of the engine (not illustrated), a turbine runner 6 and a stator 8 carried by a reaction shaft 9 via a one-way clutch 8a. The torque converter 12 includes a lock-up means or a lock-up clutch 10 which is operative when engaged to lock the torque converter 12 in a lock-up mode wherein the turbine runner 6 is directly connected to the pump impeller 4. The lock-up clutch 10 is connected to the turbine runner 6 in an axially slidable manner and cooperates with a member (converter shell) 4a coupled with the engine output shaft 2 integral with the pump impeller 4 to define a lock-up clutch oil chamber 14 and operates such that when the oil pressure within the lock-up clutch oil chamber 14 becomes lower than that within the interior of the torque converter 12. This difference in oil pressure urges the lock-up clutch 10 to be pressed against the member 4a to come into a unitary rotation therewith. The turbine runner 6 is splined to one end of the drive shaft 22 which is rotatably supported by a case 20 via bearings 16 and 18. Arranged on the drive shaft 22 between the bearings 16 and 18 is a drive pulley 24.

Figure 4:
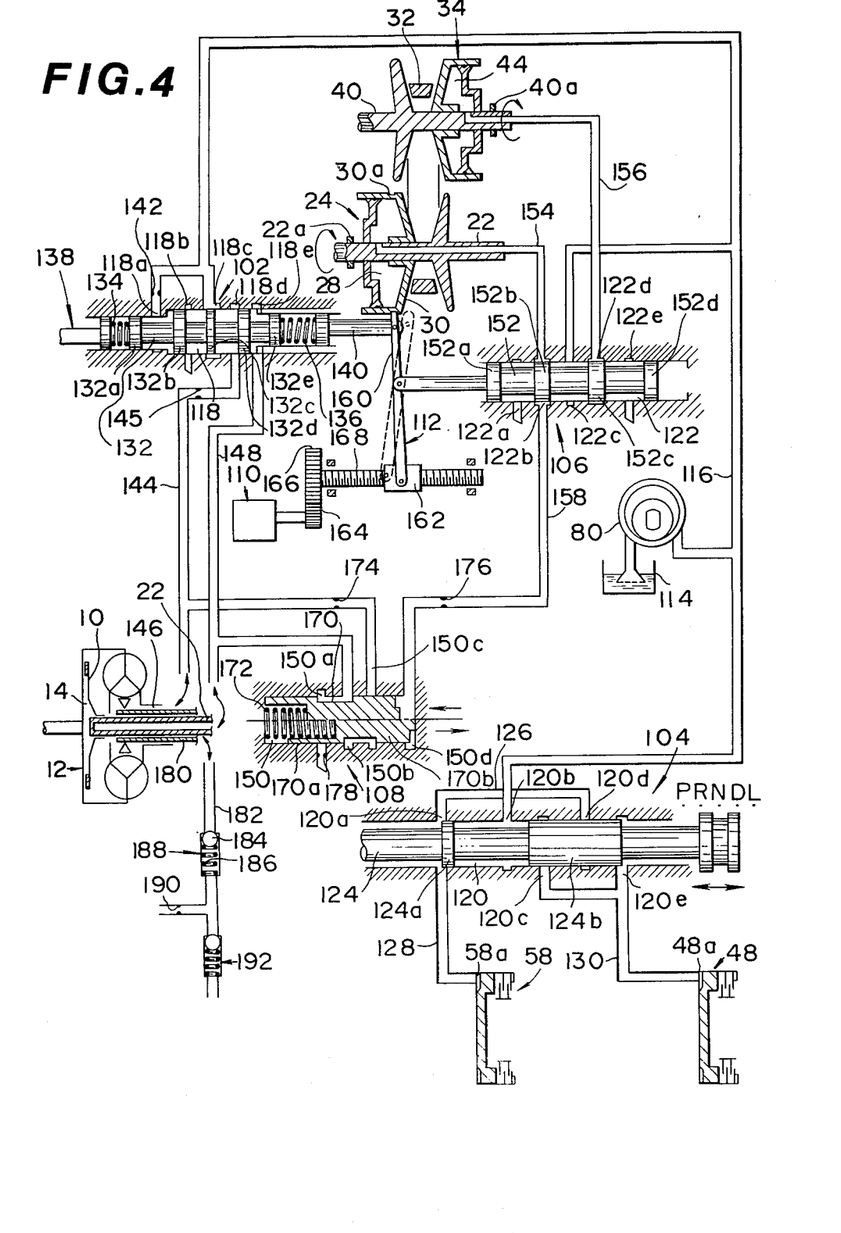
FIG. 4 is a hydraulic control system for the power transmission mechanism shown in FIG. 2 and illustrates a first embodiment.

The drive pulley 24 comprises an axially fixed conical disc 26 and an axially movable conical disc 30 which is disposed to face the axially fixed conical disc 26 to define a V-shaped pulley groove therebetween and which is allowed to slide in an axial direction of the driven shaft 22 in response to oil pressure created within a drive pulley cylinder chamber 28 (see FIG. 4). The drive pulley 24 is drivingly connected to a driven pulley 34 via a V-belt 32. Driven pully 34 is arranged on a driven shaft 40 which is rotatably supported by the case 20 via the bearings 36 and 38. The driven pulley 34 comprises an axially fixed conical disc 42 fixed to the driven shaft 40 and an axially movable conical disc 46 which is disposed to face the fixed conical disc 42 in such a manner as to define a V-shaped pulley groove and which is allowed to slide in an axial direction of the driven shaft 40 in response to oil pressure created in a driven pulley cylinder chamber 44 (FIG. 4).

The axially fixed conical disc 42 is drivingly connectable via a forward drive multiple disc clutch 48 to a forward drive gear 50 rotatably supported on the driven shaft 40, this forward drive gear being in mesh with a ring gear 52. Fixed to the driven shaft 40 is a reverse drive gear 54 which is in mesh with an idle gear 56. The idle gear 56 is drivingly connectable via a reverse drive multiple disc clutch 58 to an idle shaft 60 which has fixed thereto another idle gear 62 that is in mesh with the ring gear 52. (Although in FIG. 2 the idle gear 62, idle shaft 60 and reverse drive multiple disc clutch 58 are illustrated in positions displaced from the actually positions thereof for ease of illustration, the idle gear 62 and ring gear 52 are shown as out of mesh with each other, but, they are actually in mesh with each other as will be understood from FIG. 3). The ring gear 52 has attached thereto a pair of pinion gears 64 and 66, output shafts 72 and 74 being coupled with side gears 68 and 70, respectively, which are in mesh with the pinion gears 64 and 66 to cooperate to form a differential 67, and the output shafts 72 and 74 which are supported via bearings 76 and 78, respectively, extending outwardly of the case 20 in opposite directions. These output shafts 72 and 74 are connected to road wheels (not shown), respectively.

In FIG. 2, there is arranged on the right side of the bearing 18 an oil pump 80 of the internally toothed gearing type which serves as a source of oil pressure, oil pump 80 is driven by the engine output shaft 2 via an oil pump drive shaft 82 extending through the hollow driven shaft 22. Rotational power fed from the engine output shaft 2 to the continuously variable transmission, viz., a combination of torque converter with lock-up mechanism, continuously variable transmission mechanism and differential, is transmitted via torque converter 12, drive shaft 22, drive pulley 24, V-belt 32, driven pulley 34 to driven shaft 40. In the case where forward multiple disc clutch 48 is engaged and reverse drive multiple disc clutch 58 is released, the rotation of the shaft 40 is transmitted via the forward drive gear 50, ring gear 52 and differential 67 to the output shafts 72 and 74 to rotate them in the forward rotational direction. In the case where reverse drive multiple disc clutch 58 is engaged and forward drive multiple disc clutch 48 is released, the rotation of the shaft 40 is transmitted via the reverse drive gear 54, idle gear 56, idle shaft 60, idle gear 62, ring gear 52 and differential 67 to the output shafts 72 and 74 to rotate them in the reverse rotational direction. During this transmission of power, the rotation ratio between the drive pulley 24 and driven pulley 34 may be varied by moving the axially movable conical disc 30 of the drive pulley 24 and the axially movable conical disc 46 of the driven pulley 34 in an axial direction so as to change the radii of the diameters contacting with the V-belt 32. For example, increasing the width of the V-shaped pulley groove of the drive pulley 24 and decreasing the width of the V-shaped pulley groove of the driven pulley 34 cause a reduction in radius of the diameter of the drive pulley 24 contacting with the V-belt 32 and an increase in radius of the diameter of the driven pulley 34 contacting with the V-belt 32, resulting in an increase in reduction ratio. if the axially movable conical discs 30 and 46 are moved in the respective reverse directions, the reduction ratio is decreased. Depending upon power transmission circumstances, the torque converter serves as a torque multiplier or serves as a fluid coupling but, however, since the lock-up clutch 10 is attached to the turbine runner 6, the torque converter 12 can establish a direct mechanical connection between the engine output shaft 2 and driven shaft 22. When oil pressure is drained from the lock-up clutch oil chamber 14 the lock-up clutch 10 is pressed against the member 4a integral with the pump impeller 4.

Referring to FIG. 4, a hydraulic control system for the continuously variable transmission will now be explained. As shown in FIG. 4, the hydraulic pressure control system comprises an oil pump 80, line pressure regulator valve 102, a manual valve 104, shift ratio control valve 106, lock-up valve 108, shift motor 110, and a shift operating mechanism 112.

The oil pump 80, which is driven by the engine output shaft 2 as mentioned above discharges the oil within the tank 114 into the oil conduit 116. However, the oil pump drive shaft 82 is not illustrated in FIG. 4 for the sake of simplicity of illustration. The oil conduit 116 leads to ports 118a and 118c of the line pressure regulator valve 102 and the oil pressure therein will be regulated into a line pressure. The oil conduit 116 communicates with a port 120b of the manual valve 104 and a port 122c of the control valve 106.

The manual valve 104 has a valve bore 120 provided with five ports 120a, 120b, 120c, 102d and 120e, and a spool 124 formed with two lands 124a and 124b received in the valve bore 120. Spool 124 is actuated by a shift lever (not shown) between five detent positions "P", "R", "N", "D" and "L". The port 120a is permitted to communicate not only with a port 120d via an oil conduit 126, but also with a cylinder chamber 58a of the reverse drive multiple disc clutch 58. A port 120c is permitted to communicate not only with a port 120e by an oil conduit 130, but also with a cylinder chamber 48a of a forward drive multiple disc clutch 48. The port 120b communicates with the oil conduit 116 to receive line pressure therein. When the spool 124 is set in "P" position, the port 120b, supplied with the line pressure is covered by a land 124b, so that the cylinder chamber 58a of the reverse drive multiple disc clutch 58 is drained via the oil conduit 126 and port 120d and the cylinder chamber 48a of the forward drive multiple disc clutch 48 is drained via the port 120e. When the spool 124 is set in "R" position, the port 120b is permitted to communicate with the port 120a by a groove between the lands 124a and 124b so as to permit the line pressure to communicate with the cylinder chamber 58a for the reverse drive multiple disc clutch 58, whereas, the cylinder chamber 48a of the forward drive multiple disc clutch 48 is left drained via the port 120e. When the spool 124 is set in "N" position, the port 120b is disposed between the lands 124a and 124b and is prevented from communicating with the other ports, thus the cylinder chamber 58a of the reverse drive multiple disc clutch 58 and the cylinder chamber 48a of the forward drive multiple disc clutch 48 are drained via the port 120a and port 120e in a similar manner to the case when the spool is in "P" position. When the spool 124 is set in "D" or "L" position, the port 120b is permitted to communicate with the port 120c via the groove between the port 120b and 120c so that the line pressure is supplied to the cylinder chamber 48a of the forward multiple disc clutch 48, whereas, the cylinder chamber 58a of the reverse drive clutch 58 is drained via the port 120a. Therefore, when the spool 124 is set in "P" position or "N" position, both the forward drive multiple disc clutch 48 and reverse drive multiple disc clutch 58 are released to interrupt the transmission of power, thus preventing the rotation of output shafts 72 and 74; when the spool 124 is set in "R" position, the reverse drive multiple disc clutch 58 is engaged so as to drive the output shafts 72 and 74 in the reverse rotational direction; when the spool 124 is set in "D" or "L" position, the forward drive multiple disc clutch 48 is engaged so as to drive the output shafts 72 and 74 in the forward rotational direction. Although there no difference occurs in the hydraulic circuit between the "D" position and the "L" position, as mentioned above, both of the positions are electrically detected to actuate the shift motor 110 in such a manner so as to effect a shift control in accordance with different shift patterns.

The line pressure regulator valve 102 comprises a valve bore 118 provided with five ports 118a, 118b, 118c, 118d and 118e, a spool 132 formed with five lands 132a, 132b, 132c, 132d and 132e, and springs 134 and 136 arranged on both ends of the spool 132. It is to be noted that the lands 132a and 132e provided on the both end portions of the spool 132 are smaller in diameter than the intermediate lands 132b, 132c and 132d. The left side spring 134 is disposed between the left end of the spool 132 and a throttle link 138. Throttle link 138 is urged leftward as the throttle opening degree increases or rightward as the throttle opening degree decreases. Therefore, if the throttle opening is great, the force created by the spring 134 urging the spool 132 rightward is small, whereas, if the throttle opening degree is small, the force by the spring 134 urging the spool rightward is great. A right side spring 136 is disposed between the right end of the spool 132 and a rod 140 cooperating with the axially movable conical disc 30 of the drive pulley 24. Therefore, if the axially movable conical disc 30 of the drive pulley 24 has moved rightward (viz., in the case where the reduction ratio has decreased), the force by the spring 136 urging the spool 132 leftwardly decreases, whereas, if the axially movable conical disc 30 has moved leftward (viz., in the case where the reduction ratio is increased), the force by the spring 136 urging the spool 132 leftward increases. As mentioned before, the ports 118a and 118c of the line pressure regulator valve 102 are supplied with the output oil discharged by the oil pump 80, the inlet to the port 118a being provided with an orifice 142. The port 118b is always drained, the port 118d is connected by an oil conduit 144 to an inlet port 146 of the torque converter and a port 150c of the lock-up valve 108, the port 118e communicates via an oil conduit 148 with the lock-up clutch oil chamber 14 within the torque converter 12 and with a port 150b of the lock-up valve 108. For preventing the application an excessive pressure to the interior of the torque converter 12, the oil conduit 144 is provided with an orifice 145. Applied to the spool 134 of the line pressure regulator valve 102 are two forces in the righward direction, one by the spring 134 and the other by the line pressure acting on a differential area between the lands 132a and 132b, and two forces in the leftward direction, one by the spring 136 and the other by the pressure at the port 118e acting upon a differential area between the lands 132d and 132e, and the spool 132 adjusts the amount of drainage of the oil at the port 118c via the ports 118d and 118b (firstly the oil is drained via the port 118d into the oil conduit 114, and if it cannot afford the adjustment, the oil is drained via the port 188d, too), thus regulating the line pressure to balance the forces in the leftward and rightward directions. Therefore, the line pressure increases as the throttle opening degree increases, as the reduction ratio increases, and as the pressure at the port 118e (viz., the oil pressure building up within the lock-up clutch oil chamber 14) increases. (In this case, the torque converter 12 is in a non lock-up state because the oil pressure in the chamber 14 is high.) The adjustment of the line pressure in this manner meets the actual demands, viz., the oil pressure must be increased to increase the force with which the pulleys are urged against the V-belt 32 so as to increase the torque transmission capacity which increases with an increase in friction because the output torque of the engine increases as the throttle opening degree increases and the multiplication of the torque increases as the reduction ratio increases and besides the oil pressure must be increased to increase the transmission torque to deal with the multiplication function of the torque by the torque converter 12 when it operates in a non lock-up state prior to lock-up.

The above mentioned rightward directed force acting upon the spool 132 via spring 143 in response to the engine output torque may be created by a diaphragm device which is operative to create the force in response to an engine induction vacuum, instead of in response to the throttle opening degree. In this case the setting is made such that when the induction vacuum is high the force due to the spring 134 increases, whereas, when the induction vacuum is low, the force due to the spring 134 decreases, so that a similar result to that obtained in the use of the throttle opening is obtained.

The shift control valve 106 has a valve bore 122 formed with five ports 122a, 122b, 122c, 122d and 122e, and a spool 152 received in the valve bore 122 and formed with four lands 152a, 152b, 152c and 152d. The center port 122c communicates with the oil conduit 116 which is supplied with the line pressure, the left port 122b and right port 122d communicate via respective conduits 154 and 156 with the drive pulley cylinder chamber 28 of the drive pulley 24 and the driven pulley cylinder chamber 44 of the driven pulley 34. The port 122b communicates via an oil conduit 158 with a port 150d of the lock-up valve 108, too. Both of the end ports 122a and 122e are drained. The left end of the spool 152 is linked to a substantially middle portion of a lever 160 of the later-mentioned shift operating mechanism 112. The axial length of each of the lands 152b and 152c is slightly smaller than the width of the corresponding one of the ports 122b and 122d, whereas, the axial length between the lands 152b and 152c is substantially the same as the axial length between the ports 122b and 122d. Therefore, a portion of the line pressure supplied via the port 122c to the oil chamber between the lands 152b and 152c is allowed to pass through a clearance formed between the land 152b and the port 122b to flow into an oil conduit 154, but the remaining portion thereof is allowed to pass through another clearance formed between the land 152b and the port 122b to be drained, so that the pressure within the oil conduit 154 is determined depending upon the ratio between the areas of the above-mentioned clearances. In a similar manner, the pressure within the oil conduit 156 is determined depending upon the ratio of the areas of clearances formed between the edges of the land 152c and the port 122d. Therefore, if the spool 152 is disposed in the center position, the relationship of the land 152b with the port 122b becomes equal to that of the land 152c with the port 122d, thus causing the pressure in the oil conduit 154 to become equal to that in the oil conduit 156. As the spool 152 moves leftwardly, the clearance of the port 122b on the line pressure side increases and the clearance thereof on the drain side decreases, thus allowing the pressure in the oil conduit 154 to increase accordingly, whereas, the clearance of the port 122d on the line pressure side decreases and the clearance thereof on the drain side increases, thus causing the pressure in the oil conduit 156 to decrease accordingly. This causes an increase in pressure in the drive pulley cylinder chamber 28 of the drive pulley 24, resulting in a decrease in the width of the V-shaped pulley groove, and a reduction in pressure in the driven pulley cylinder chamber 44 of the driven pulley 34, resulting in an increase in the width of the V-shaped pulley groove, so that because the radius of the diameter of the drive pulley 24 contacting with the V-belt increases and the radius of the diameter of the driven pulley 34 contacting with the V-belt decreases, a reduction ratio decreases. Conversely, urging the spool 152 to move rightwardly causes the reverse action to that mentioned above to cause an increase in the reduction ratio.

The lever 160 of the shift operating mechanism 112, which lever is pin connected at its middle portion with the spool 152 of the shift control valve 106, has its one end received in an annular groove 30a formed in the axially movable conical disc 30 of the drive pulley 24 and has its opposite end pin connected with the sleeve 162. The sleeve 162 is internally threaded to mesh with the thread formed on the shaft 168 which is rotatable by the shift motor 110 via the gears 164 and 166. With this shift operating mechanism 112, if the shift motor 110 is rotated to rotate the shaft 168 via the gears 164 and 166 in one rotational direction to cause the sleeve 162 to move leftward, the lever 160 moves in a clockwise rotational direction with its end portion received by the annular groove 30a of the axially movable conical disc 30 of the drive pulley 24 as an fulcrum point, causing the leftward movement of the spool 152 connected to the lever 160 of the shift control valve 106. This causes a rightward movement of the axially movable conical disc 30 of the drive pulley 24 in a manner mentioned before to decrease the width of the V-shaped pulley groove, while, at the same time, the width of the V-shaped pulley groove of the driven pulley 34 increases, thus resulting in a reduction in the reduction ratio. Since the one end of the lever 160 is engaged with the groove 30a around the outer periphery of the axially movable conical disc 30, urging the axially movable conical disc 30 rightward will rotate the lever 160 clockwise with that end of the lever 160 which is pin connected with the sleeve 162 as a fulcrum. This causes the spool 152 to move back rightward, tending to cause the drive pulley 24 and driven pulley 34 to assume the state accomplishing a low reduction ratio. This action causes the spool 152 and the drive pulley 24 and driven pulley 34 to assume a state accomplishing a reduction ratio depending upon the amount of rotation of the shift motor 110. The same types action occurs if the shift motor 110 is rotated in the reverse direction. Therefore, if the shift motor 110 is actuated in accordance with a predetermined shift pattern, the reduction ratio varies accordingly, thus making it possible to control the shift in the continuously variable transmission by controlling the shift motor 110, alone.

The shift motor 110 is controlled by a control unit, not illustrated, which detects a revolution speed of the drive pulley 24 and a parameter indicative of the output torque of the engine, such as a throttle opening degree, wherein a desired value in engine revolution speed is determined using a predetermined function which defines for any value in the parameter indicative of the output torque of the engine a desired value in engine revolution speed. The control unit operates the shift motor to control the reduction ratio in such a manner as to maintain the revolution speed of the drive pulley in a predetermined relationship with the desired value in engine revolution speed. The control method and apparatus are described in co-pending U.S. application Ser. No. 362,489 (Japanese associate ref: 151-81) entitled "METHOD AND APPARATUS FOR CONTROLLING CONTINUOUSLY VARIABLE V-BELT TRANSMISSION," filed concurrently with the present application by the same inventors and commonly assigned herewith, the disclosure of which application is hereby incorporated by reference in its entirety.

The lock-up valve 108 comprises a valve bore 150 formed with four ports 150a, 150b, 150c and 150d, a spool 170 having two lands 170a and 170b, and a spring 172 biasing the spool 170 rightwardly. The port 150d communicates with a port 122b of the shift control valve 106 through an oil conduit 158, the ports 150b and 150c communicate respectively through oil conduits 148 and 144 with the port 118e of the line pressure regulator valve 102 and the port 118d thereof, and the port 150a is drained. The oil conduits 144 and 158 and a drain oil conduit extending from the port 150a are provided with orifices 174, 176 and 178, respectively. The same oil pressure as that applied to the torque converter inlet port 146 is applied to the port 150c via the oil conduit 144, but when the oil pressure applied to the port 150d via the oil conduit 158 (the same oil pressure at that within the drive pulley cylinder chamber 28) is high enough as to press the spool 170 to the left against the force of the spring 172, the port 150c is blocked by the land 170b and the port 150b is drained via the port 150a. Therefore, the lock-up clutch oil chamber 14 which communicates with the port 150b via the oil conduit 148 is drained, thus permitting the lock-up clutch 10 to assume an engaged state by the pressure within the torque converter 12, rendering the torque converter to operate in lock-up state wherein the torque converter has no function as a torque converter. Conversely, if the oil pressure at the port 150d decreases to cause a leftward directed force to become smaller than a rightward directed force due to the spring 172, spool 170 moves rightward to a position wherein the port 150b is allowed to communicate with the port 150c. This causes the oil conduit 148 to communicate with the oil conduit 144, allowing the same oil pressure as that applied to the torque converter inlet port 146 to reach the lock-up clutch oil chamber 14, allowing the pressures on the both sides of the lock-up clutch 10 to become equal to each other, resulting in the release of the lock-up clutch 10. The orifice 178 is provided to prevent rapid drainage of the oil pressure from the lock-up clutch oil chamber 14 so as to alleviate a shock upon shifting into lock-up state, whereas, the orifice 174 is provided in the oil conduit 144 to permit a gradual increase in oil pressure within the lock-up oil chamber 14 so as to alleviate a shock upon release of the lock-up state. An orifice 176 is provided in an oil conduit 158 to prevent the occurrence of a chattering in the lock-up valve 108 owing to small variations in oil pressure in the drive pulley cylinder chamber 28.

The torque converter outlet port 180 communicates with the oil conduit 182 which is provided with a relief valve 188 including a ball 184 and a spring 186 and thus, with this relief valve, the pressure within the torque converter 12 is maintained at a constant pressure. The oil downstream of the relief valve 188 is introduced by an oil conduit 190 to an oil cooler and a lubricant circuit, both being unillustrated, and is finally drained, whereas, an excessive oil is drained by another relief valve 192, the thus drained oil being returned finally to a tank 114.

As will be readily understood from FIG. 4 and the following description, the conduit 148 which communicates the port 150b and lock-up clutch chamber 14 with the port 118e of the line pressure regulator valve 138 allows a step like reduction in the level of line pressure when the torque converter 12 locks up to cease its torque multiplication function. When the oil pressure in the drive pulley cylinder chamber 28 is low, such as when a great reduction ratio is required upon moving off from rest, the spool 170 of the lock-up valve 108 takes the position illustrated by the lower half thereof in the drawing to allow the oil pressure in the conduit 144 into the lock-up clutch chamber 14 via the port 150b and into the port 118e of the line pressure regulator valve 138. The supply of the oil pressure to the lock-up clutch chamber 14 releases the lock-up clutch 10, allowing the torque converter 12 to multiply torque. This state of the torque converter is indicated by the oil pressure in the oil conduit 148. The oil pressure builds up in the conduit 148 while the torque converter performs a torque multiplication function and the level of the line pressure is boosted by the oil pressure in the conduit 148. When the oil pressure in the drive pulley 28 increases sufficiently, such as during cruising operation, as to displace the spool 170 of the lock-up valve 108 against the spring 172 to the position illustrated by the upper half thereof in the drawing, the port 150b is open to the drain port 150a, discharging oil from the lock-up clutch chamber 14 and from the port 118e of the line pressure regulator valve 138 via the oil conduit 148. This causes the lock-up clutch 10 to be engaged to lock the torque converter in lock-up mode wherein there occurs no torque multiplication. This also causes a drop in the level of the line pressure in a step like manner from the level of the line pressure for operation of the torque converter in non lock-up mode or torque converter mode. This is because the leftward directed force due to the oil pressure acting on the differential area between the land 132d and 132e drops to substantially zero upon locking the torque converter 12 in lock-up mode.

Therefore, during operation in non lock-up state, the line pressure is kept high, while, during operation in lock-up state, the line pressure is kept low. Since, during operation in lock-up state, the torque converter 12 does not perform the torque multiplication function, a shortage in power transmission capacity by the V-belt 32 does not take place even if the line pressure is low.

It will be appreciated that the line pressure can be increased or decreased depending upon a change in the torque multiplication by the torque converter 12 in a very simple manner. With the line pressure control thus far described, the magnitude of the force applied to the V-belt 32 which is created by the oil pressure in the pulley cylinder chambers 28 and 44 can be optimized depending upon lock-up state or non lock-up state of the torque converter 12. The power transmission efficiency therefore has been improved. Since it is not necessary for the oil pump 80 to always discharge high pressurized oil, a loss on the part of the oil pump has been decreased.

Figure 5:
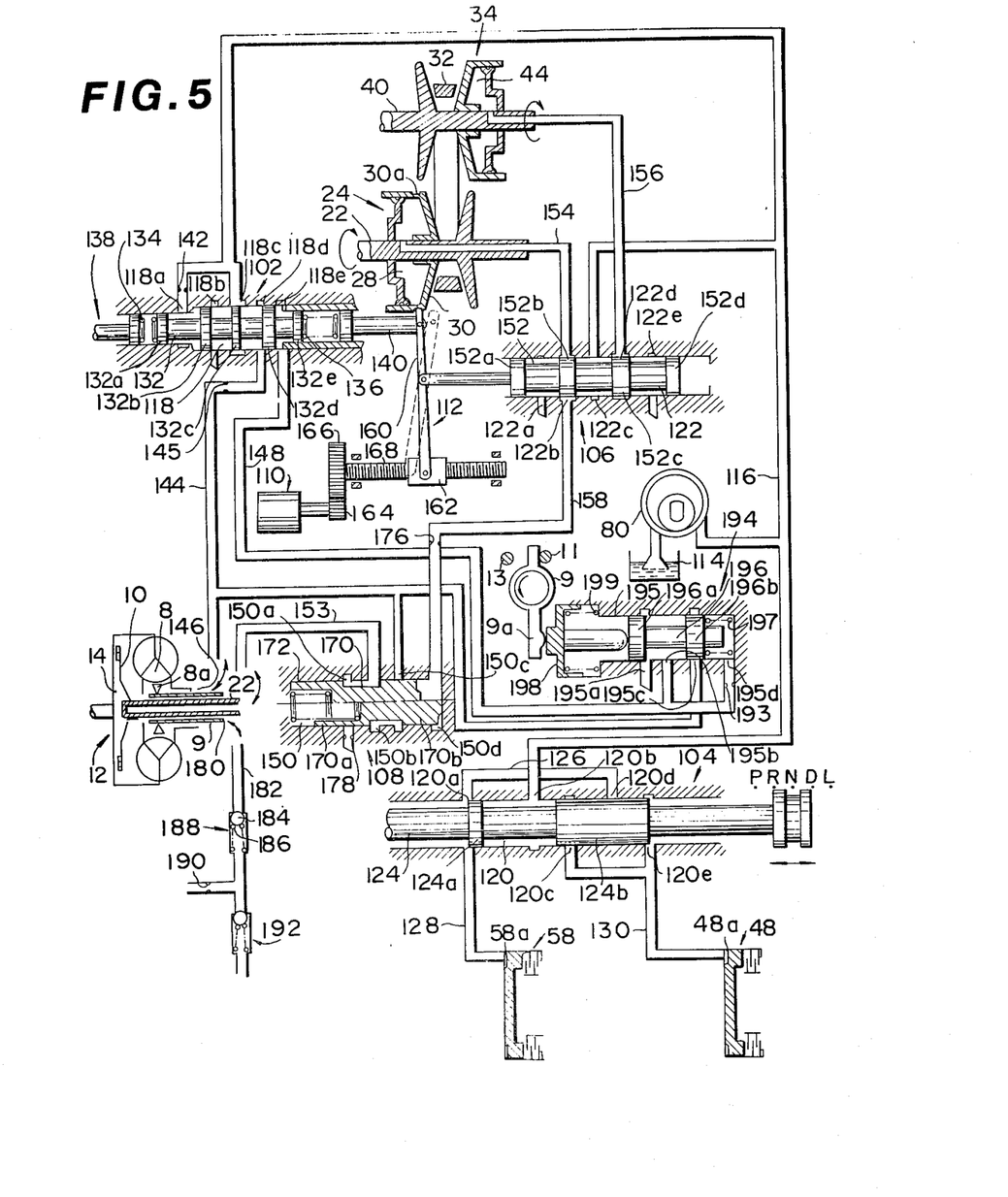
FIG. 5 illustrates a second embodiment.

Referring to the second embodiment illustrated in FIG. 5, this embodiment is different from the embodiment illustrated in FIG. 4 in that an oil pressure variable with the variation in the reaction of a stator 8 of a torque converter 12 is supplied to a port 118e of a line pressure regulator valve 102 to act upon a differential area between lands 132d and 132e. The oil pressure variable with the magnitude of the stator reaction is produced by a converter detector valve 194 which is described hereinafter.

The converter detector valve 194 comprises a valve bore formed with four ports 195a, 195b, 195c and 195d, a corresponding spool 196 to the valve bore having two lands 196a and 196b, a spring 197 biasing the spool 196, leftward, and a slider 198 coaxially arranged to the spool 196 for slidable movement, and a return spring 199 biasing the slider 198 leftward, wherein the slider 198 is biased by a lever 9a rotatable in unison with a reaction shaft 9 which carries the stator 8 of the torque converter 12 via a one-way clutch 8a. When a reaction is applied to the stator 8 due to flow of oil within the torque converter 12 (viz., when the torque converter performs torque multiplication function), the reaction shaft 9 is urged to rotate in a counter clockwise direction in accordance with the magnitude of the reaction. Provision is made to prevent the unnecessary rotation of the reaction shaft 9 by stops 11 and 13. The port 195a is a drain port, and the ports 195b and 195d are connected to the port 118e of the line pressure regulator valve 102 through the oil conduit 148 and to the port 150e of the lock-up valve 108, and the port 195c is connected to the port 118d of the line pressure regulator valve 102 through the oil conduit 144. The lands 196a and 196b of the spool 196 are such that when one of the lands begins to open the port 195a or 195c, the other land begins to close the other port 195c or 195a.

The converter detector valve 194 operates in the following manner. Under a condition when no force acts upon the reaction shaft 9 (via., when the torque converter 12 does not perform the torque multiplication function), since no force is applied by the lever 9a to the spool 196 via the slider 198, the spool 196 is urged leftward by the spring 197 to the position wherein the port 195c is closed by the land 196b and the port 195b is drained off to the port 195a. Accordingly, the oil conduit 148 is drained off, thus allowing no oil pressure to act upon the port 118e of the line pressure regulator valve 102. This causes the line pressure to be regulated to a low level. Under a condition wherein the torque converter 12 performs the torque multiplication function, a reaction acts on the stator 8, causing the reaction shaft 9 to rotate counter clockwise in accordance with the magnitude of the reaction. (As is well known, since the torque converter multiplies torque by an amount corresponding to the magnitude of the reaction on the stator, it follows that the more the multiplied torque, the more the stator reaction increases in magnitude.) The rotation of the reaction shaft 9 is transmitted via the slider 198 to the spool 196, thus urging the spool 196 rightward. This rightward movement of the spool 196 gradually open the port 195c to which pressurized oil is supplied from the line pressure regulator valve 102 and closes the drain port 195a, causing the oil pressure to build up in the port 195b. This oil pressure is fed to the port 195d to urge the spool 196 leftward so that the spool assumes that position at which the rightward directed force due to the slider 198 balances with a leftward directed force due to the above-mentioned oil pressure and a leftward directed force by the spring 197, causing a modulated oil pressure corresponding to this balanced state to build up at the port 195b. Therefore, the higher the stator reaction, the higher the oil pressure at the port 195b becomes. This oil pressure is fed to the port 118e of the line pressure regulator valve 102 via the oil conduit 148, causing the line pressure regulator valve 102 to increase the level of the line pressure. As the oil pressure at the port 195b of the converter detector valve 194 increases. The manner of increase in the line pressure is in proportion to the magnitude of the stator reaction. It follows that the line pressure is increased in proportion to the magnitude of the resultant torque produced after torque multiplication by the torque converter 12. Thus, the magnitude of the torque transmission capacity by the V-belt 32 can be appropriately controlled to meet the actual demands. When the torque converter 12 ceases its torque multiplication function, such as when the lock-up clutch 10 is engaged to lock the torque converter 12, the line pressure decreases, thus preventing the occurrence of unnecessarily high oil pressure. It goes without saying that the line pressure is controlled dependent upon the throttle opening degree irrespective of the state when the torque multiplication is effected or not, so that the line pressure is modulated always in response to the engine output.

The manner of decrease in the line pressure upon establishing the lock-up state of the torque converter 12 is continuous and not in a step like manner as is the case in the first embodiment.

What is claimed is:

1. A continuously variable V-belt transmission comprising:
    a continuously variable V-belt transmission unit having a drive shaft and a driven shaft;
    a hydrodynamic transmission unit having a pump impeller and a turbine runner drivingly connected to the drive shaft of the continuously variable V-belt transmission unit, said hydrodynamic transmission unit having a lock-up mode of operation in which said hydrodynamic transmission is locked;
    the continuously variable V-belt transmission unit having a V-belt running over a drive and a driven pulley, each having a cylinder chamber and two conical discs, one conical disc of the driven pulley being secured to the drive shaft, one conical disc of the driven pulley being secured to the driven shaft, the other conical disc of the drive pulley being controllably movably in an axial direction of the drive shaft in response to fluid pressure in the cylinder chamber thereof, the other conical disc of the driven pulley being controllably movable in an axial direction of the driven shaft in response to fluid pressure in the cylinder chamber thereof;
    means responsive to said hydrodynamic transmission unit operating in said lock-up mode for producing a signal indicative of the hydrodynamic transmission unit being in said lock-up mode of operation;
    pumping means for pumping fluid; and
    line pressure regulator valve means for regulating the fluid supplied by said pumping means in response to said signal to provide a line pressure which varies in response to the hydrodynamic transmission unit operating in said lock-up mode.

2. A continuously variable V-belt transmission as claimed in claim 1, including means connected to said line pressure regulator valve means for regulating fluid supply to and discharge from at least one of the cylinder chambers.

3. A continuously variable V-belt transmission as claimed in claim 1 or 2, wherein said hydrodynamic transmission unit includes lock-up means operative when engaged to lock the hydrodynamic transmission unit in said lock-up mode.

4. A continuously variable V-belt transmission as claimed in claim 3, including control means for engaging said lock-up means, and lock-up valve means communicating with said control means via a fluid conduit and operative to control fluid supply to and discharge from said control means via the fluid conduit.

5. A continuously variable V-belt transmission as claimed in claim 4, wherein said means for producing the signal includes means for conducting the fluid in said fluid conduit to said line pressure regulator valve means.

6. A continuously variable V-belt transmission as claimed in claim 5, wherein said lock-up means includes a clutch for directly connecting the pump impeller of said hydrodynamic transmission unit with the turbine runner thereof and said control means includes a lock-up clutch member which communicates with said fluid conduit, and said control means being operative operative to engage said clutch when the fluid is discharged from the lock-up clutch chamber by said lock-up valve means and to release said clutch when the fluid is supplied to the lock-up clutch chamber by said lock-up valve means, and wherein said line pressure regulator valve means is formed with a port and is operative to increase the level of the line pressure when the fluid is supplied to said port and said means for conducting the fluid is connected to said port, whereby said line pressure regulator valve means reduces the level of line pressure when said lock-up valve means discharges the fluid from said lock-up clutch chamber.

7. A continuously variable V-belt transmission as claimed in claim 6, wherein said lock-up valve means communicates with the cylinder chamber of the drive pulley and supply the fluid to said fluid conduit when the fluid pressure in the cylinder chamber of the drive pulley is lower than a predetermined value and discharges the fluid from said fluid conduit when the fluid pressure in the cylinder chamber of the drive pulley is higher than said predetermined value.

8. A continuously variable V-belt transmission as claimed in claim 4, wherein said hydrodynamic transmission unit includes a stator and wherein said means responsive to said hydrodynamic unit operating in said lock-up mode is responsive to stator reaction of said stator to produce a signal indicative of the stator reaction.

9. A continuously variable V-belt transmission as claimed in claim 8, wherein said line pressure regulator valve means is responsive to output of an engine and also to a reduction ratio of the continuously variable V-belt transmission unit.

10. A continuously variable V-belt transmission as claimed in claim 8 or 9, wherein said means responsive to the hydrodynamic transmission unit operating in said lock-up mode comprises a reaction shaft carrying the stator via a one-way clutch, a lever connected to the reaction shaft for rotation therewith, and a pressure regulator valve means responsive to said lever for supplying fluid pressure indicative of the stator reaction to said line pressure regulator valve means.

11. A continuously variable V-belt transmission as claimed in claim 10, wherein said line pressure regulator valve means is formed with a port and operative to increase the level of the line pressure as the fluid pressure supplied to said port increases, whereby said line pressure regulator valve means reduces the level of the line pressure as the stator reaction decreases.

12. A continuously variable V-belt transmission comprising:
a continuously variable V-belt transmission unit having a drive shaft, a driven shaft, a drive pulley on the drive shaft, a driven pulley on the driven shaft and a V-belt running over the drive and driven pulleys;
a hydrodynamic transmission unit having a pump impeller and a turbine runner fluidly connected to the pump impeller, the turbine runner being drivingly connected to the drive shaft of the continuously variable V-belt transmission unit, the hydrodynamic transmission unit including a fluid operated lock-up clutch which is engageable to lock the hydrodynamic transmission unit in a lock-up mode;
a pump delivering fluid;
a line pressure regulator valve having a valve bore formed with a high pressure port connected to said pump for receiving the fluid therefrom and a low pressure port, and a spool with a plurality of lands slidably disposed in the valve bore for regulating a fluid flow from the high pressure port toward the low pressure port, said spool having a pressure acting area;
means connected to said high pressure port of said line pressure regulator valve for regulating fluid supply to and fluid discharge from said continuously variable V-belt transmission unit so as to control a reduction ratio; and
signal pressure generating means for supplying the pressure acting area of the spool of said line pressure regulator valve with a fluid pressure signal which varies when said hydrodynamic transmission unit shifts into the lock-up mode,
whereby the line pressure regulator valve decreases the line pressure when said hydrodynamic transmission unit shifts into the lock-up mode.

13. A continuously variable V-belt transmission as claimed in claim 12, wherein said fluid operated lock-up clutch includes a lock-up chamber and is engageable in response to fluid pressure in the lock-up chamber thereof, and said signal pressure generating means includes a fluid conduit connecting the lock-up chamber of said fluid operated lock-up clutch to the pressure acting area of the spool of said line pressure regulator valve.

14. A continuously variable V-belt transmission as claimed in claim 12, wherein said hydrodynamic transmission unit includes a reaction shaft, a stator mounted on the reaction shaft via a one-way clutch, and said signal pressure generating means comprises a lever coupled to said reaction shaft, and a converter detector valve operatively connected to said lever for converting a magnitude of reaction carried by said stator to a fluid pressure variable with the magnitude of the reaction, said converter detector valve means supplying the fluid pressure variable with the magnitude of the reaction to the pressure acting area of the spool of said line pressure regulator valve as said fluid pressure signal.

* * * * *